United States Patent [19]

Linssen

[11] Patent Number: 5,463,281
[45] Date of Patent: Oct. 31, 1995

[54] CIRCUIT ARRANGEMENT FOR OPERATING A HIGH-PRESSURE DISCHARGE LAMP

[75] Inventor: Henricus M. H. Linssen, Eindhoven, Netherlands

[73] Assignee: U.S. Philips Corporation, New York, N.Y.

[21] Appl. No.: 207,899

[22] Filed: Mar. 7, 1994

Related U.S. Application Data

[63] Continuation of Ser. No. 964,680, Oct. 21, 1992, abandoned.

[30] Foreign Application Priority Data

Nov. 13, 1991 [EP] European Pat. Off. .............. 91202945

[51] Int. Cl.⁶ .................................................. H05B 37/02
[52] U.S. Cl. ............... 315/209 R; 315/207; 315/DIG. 5; 315/DIG. 7
[58] Field of Search ...................... 315/209 R, DIG. 7, 315/207, 211, 216, 215, DIG. 5

[56] References Cited

U.S. PATENT DOCUMENTS

| | | | |
|---|---|---|---|
| 4,734,624 | 3/1988 | Nogase et al. | 315/DIG. 7 |
| 4,816,720 | 3/1989 | Nomoto et al. | 315/209 R |
| 4,912,374 | 3/1990 | Nagase et al. | 315/DIG. 7 |
| 4,949,016 | 8/1990 | De Bijl et al. | 315/208 |
| 5,075,599 | 12/1991 | Overgoor et al. | 315/224 |
| 5,166,579 | 1/1992 | Kawabata et al. | 315/209 R |

FOREIGN PATENT DOCUMENTS

| | | |
|---|---|---|
| 0408121 | 1/1991 | European Pat. Off. . |
| 0411617 | 2/1991 | European Pat. Off. ......... 315/DIG. 7 |
| 0477587 | 4/1992 | European Pat. Off. . |
| 3925654 | 2/1991 | Germany . |

*Primary Examiner*—William L. Sikes
*Assistant Examiner*—James Dudek
*Attorney, Agent, or Firm*—Brian J. Wieghaus; Laurie E. Gathman

[57] ABSTRACT

A circuit arrangement for operating a discharge lamp, comprising a DC-AC converter provided with a branch comprising a series circuit of two switching elements, each switching element being shunted by a unidirectional element, while ends of the branch are provided with connection terminals suitable for connection to poles of a DC voltage source, a load branch comprising inductive means and lamp connection connection terminals suitable for accommodating a lamp, which load branch shunts one of the switching elements of branch. A first drive circuit I for generating a first drive signal during stationary lamp operation for rendering each of the switching elements in the branch alternately conducting and non-conducting, whereby each switching element is rendered conducting and non-conducting once in succession within a time interval during which the other switching element is non-conducting. The circuit arrangement is in addition provided with a second drive circuit II coupled to the first drive circuit I for generating a second drive signal for rendering each of the switching elements alternately conducting and non-conducting, whereby each switching element is rendered consecutively conducting and non-conducting more than once within a time interval during which the other switching element is kept in the non-conducting state by the first drive signal. A lamp operated on the circuit arrangement has good take-over characteristics, while at the same time the run-up of the lamp is well controllable.

16 Claims, 1 Drawing Sheet

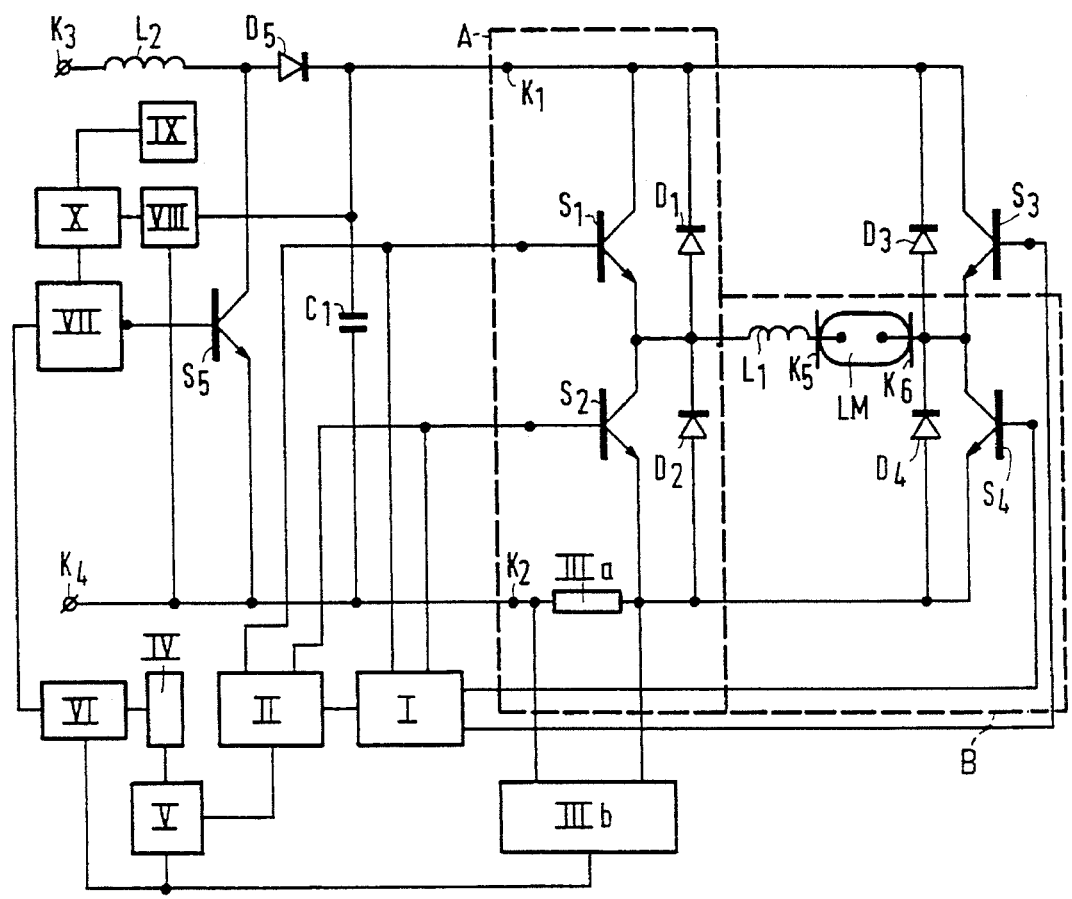

CIRCUIT ARRANGEMENT FOR OPERATING A HIGH-PRESSURE DISCHARGE LAMP

This is a continuation of application Ser. No. 07/964,680, filed Oct. 21, 1992 now abandoned.

FIELD OF THE INVENTION

The invention relates to a circuit arrangement for operating a discharge lamp, comprising a DC-AC converter provided with a branch A comprising a series circuit of two switching elements, each switching element being shunted by a unidirectional element, while ends of the branch A are provided with connection terminals K1 and K2 suitable for connection to poles of a DC voltage source, a load branch B comprising inductive means and lamp connection terminals suitable for accommodating a lamp, which load branch shunts one of the switching elements of branch A, a first drive circuit I for generating a first drive signal during stationary lamp operation for rendering each of the switching elements in branch A alternately conducting and non-conducting, whereby each switching element is rendered conducting and non-conducting once in succession within a time interval during which the other switching element is non-conducting.

BACKGROUND OF THE INVENTION

A circuit arrangement as described in the above paragraph is known from European Patent Application EP-A-0408121 A2.

The frequency of the first drive signal in the known circuit arrangement is comparatively low, so that a lamp operated with the circuit arrangement carries a direct current which is commuted with a comparatively low frequency. The luminous efficacy of some types of discharge lamps, more in particular of some types of high-pressure discharge lamps, is comparatively high when these lamps are operated with a direct current. To prevent cataphoresis in the discharge lamp, it is often necessary to commute the direct current at a low frequency.

Disadvantages of the known circuit arrangement in the case in which the lamp operated with the circuit arrangement is a high-pressure discharge lamp are inter alia a comparatively bad take-over after lamp ignition and the lack of adequate provisions for controlling the run-up of the lamp. Take-over is here understood to mean the stabilization of the discharge in the lamp after ignition. The comparatively bad take-over of the lamp may result in the discharge initialized in the lamp by the ignition failing to stabilize, so that the lamp extinguishes. The run-up of the high-pressure discharge lamp takes place in the time interval between ignition of the high-pressure discharge lamp and the moment stationary operating conditions are achieved. The voltage across the lamp increases strongly during the run-up. As a result, the DC voltage source from which the DC-AC converter is supplied during the run-up of the lamp must supply a continually changing DC voltage, which is difficult to realize in practice.

SUMMARY OF THE INVENTION

The invention has for its object to provide a circuit arrangement of the kind mentioned in the opening paragraph wherein a high-pressure discharge lamp operated by this circuit arrangement will have a comparatively good take-over while the circuit arrangement also controls the run-up of the high-pressure discharge lamp.

A circuit arrangement according to the invention is for this purpose characterized in that the DC-AC converter is also provided with a second drive circuit II coupled to the first drive circuit I for generating a second drive signal for rendering each of the switching elements alternately conducting and non-conducting, whereby each switching element is rendered consecutively conducting and non-conducting more than once within a time interval during which the other switching element is kept in the non-conducting state by the first drive signal.

The circuit arrangement is in two different operational states, alternating with the frequency of the first drive signal, during the run-up of a high-pressure discharge lamp operated on the circuit arrangement according to the invention. In the first operational state, a first switching element of branch A is made conducting and non-conducting alternately by the second drive signal, while the first drive signal keeps the other switching element in the non-conducting state. In the second operational state, the second drive signal makes the other switching element conducting and nonconducting alternately, while the first switching element is kept in the non-conducting state by the first drive signal. The circuit acts as a forward converter in both these operational conditions. The choice of a comparatively high value for the frequency of the second drive signal in relation to the frequency of the first drive signal achieves that the lamp current during the lamp run-up has the shape of a low-frequency commutated direct current with a comparatively high-frequency, substantially triangular alternating current superimposed thereon. The frequency of the low-frequency commutation of the direct current is equal to the frequency of the first drive signal, and the frequency of the comparatively high-frequency, substantially triangular alternating current is equal to the frequency of the second drive signal. The amplitude of the comparatively high-frequency substantially triangular alternating current is comparatively small in relation to the amplitude of the low-frequency commutated direct current. It was found that lamp operation in the first and second operational state of the circuit arrangement leads to a good take-over of the high-pressure discharge lamp after ignition. At the same time, a comparatively high voltage drop is present across the inductive means in the load branch B. The value of this voltage drop is determined substantially exclusively by the amplitude of the high-frequency, substantially triangular alternating current. The moment the voltage across the high-pressure discharge lamp increases during the run-up of the high-pressure discharge lamp, the voltage drop across the inductive means decreases correspondingly, because the amplitude of the comparatively high-frequency, substantially triangular alternating current decreases. This leads to the possibility for the DC voltage with which the DC-AC converter is supplied to remain substantially constant during the run-up of the high-pressure discharge lamp, while nevertheless the lamp voltage can continually change, so that a good control of the run-up of the high-pressure discharge lamp is realized. After the run-up of the high-pressure discharge lamp, the first drive signal renders each switching element of branch A alternately conducting and non-conducting, whereby each switching element is rendered consecutively conducting and non-conducting once within a time interval during which the other switching element is non-conducting. This lamp operation corresponds to the lamp operation mentioned in European Patent Application 0408121 A2.

For certain applications it is desirable that the circuit arrangement is in addition provided with a DC-DC converter coupled to connection terminals K1 and K2. This could be the case when the circuit arrangement is used for operating metal halide motorcar lamps in a motorcar. Since the burning voltage during stationary operation of metal halide motorcar lamps is in general higher than the voltage supplied by a battery present in the motorcar, it is necessary to bring the DC voltage supplied by the battery to a higher value by of a DC-DC converter. As was indicated above, the DC voltage supplied by the DC-DC converter by which the DC-AC converter is supplied can be kept at a substantially constant value in a circuit arrangement according to the invention not only during stationary lamp operation, but also during the run-up of the lamp. This means that the configuration of the DC-DC converter can be comparatively simple.

A preferred embodiment of a circuit arrangement according to the invention is provided with a first signal generating device III ("device III") for generating a first signal ("Si1") which represents the lamp current, a second signal generating device IV ("device IV") for generating a second signal ("Si2") which represents a desired value of the lamp current, and a second drive signal adjustment device V ("device V") for adjusting a duty cycle of the second drive signal in dependence on the signals Si1 and Si2. The signal Si2 may be either substantially time-independent or time-dependent. In the latter case it is possible to adjust the amplitude of the direct current through the high-pressure discharge lamp substantially to an optimum instantaneous value through a suitable choice of the time-dependence of the signal Si2. Since the current through the high-pressure discharge lamp is controlled during the run-up, a further control of the run-up of the high-pressure discharge lamp is realized in this preferred embodiment.

A further preferred embodiment of the circuit arrangement comprises both a DC-DC converter and device III, device IV and device V, and is characterized in that the DC-DC converter comprises a switching element S5, and in that the circuit arrangement is also provided with a first adjustment device VI ("device VI") for adjusting the duty cycle of the switching element of the DC-DC converter in dependence on the signal Si1 and the signal Si2, a third signal generating device VIII ("device VIII") for generating a third signal ("Si3") which represents the potential difference between connection terminals K1 and K2, a fourth signal generating device IX ("device IX") for generating a fourth signal ("Si4") which represents a desired value of the potential difference between connection terminals K1 and K2, and a duty cycle adjustment device VII ("device VII") for adjusting the duty cycle of the switching element of the DC-DC converter in dependence on the signal Si3 and the signal Si4. The use of this further preferred embodiment renders it possible to control the potential difference between connection terminals K1 and K2 at a substantially constant value with the device VII during the run-up of the high-pressure discharge lamp in such a manner that the voltage across the high-pressure discharge lamp can increase while at the same time the current through the high-pressure discharge lamp is controlled by device V. After the run-up of the high-pressure discharge lamp, during stationary lamp operation, the voltage across the high-pressure discharge lamp is substantially constant and the lamp current is controlled in that the device VI adjust the duty cycle of the switching element S5 of the DC-DC converter in dependence on the signal Si1 and on the signal Si2. A further control of lamp operation is realized in this way.

BRIEF DESCRIPTION OF THE DRAWINGS

Embodiments of the invention will be explained in more detail with reference to a drawing, in which FIG. 1 shows an embodiment of a circuit arrangement according to the invention.

DESCRIPTION OF THE PREFERRED EMBODIMENTS

In FIG. 1, branch A is formed by connection terminals K1 and K2, switching elements S1 and S2, and diodes D1 and D2 which in this embodiment are the unidirectional elements. Both the branch comprising coil L1, which forms the inductive device in this embodiment, lamp connection terminals K5 and K6 suitable for accommodating a lamp, switching element S4 and diode D4, and the branch comprising coil L1, lamp connection terminals K5 and K6, switching element S3 and diode D3 can be regarded as a load branch in this embodiment. The former branch forms load branch B and the latter branch forms load branch B'. A high-pressure discharge lamp LM, referred to as the lamp LM hereinafter, is connected to the lamp connection terminals K5 and K6. The DC-AC converter is formed by branch A, load branch B, switching element S3, diode D3, first drive circuit I and second drive circuit II. DC connection terminals K3 and K4, suitable for connecting a DC voltage source, coil L2, diode D5, capacitor C1, switching element S5 and circuit portion VII together form a DC-DC converter. In addition, the circuit arrangement comprises resistor IIIa, integrator IIIb and circuit portions IV, V, VI, VIII, IX and X. In this embodiment, the resistor IIIa and the integrator IIIb together form the device III, while the circuit portions IV, V, VI, VII, VIII, IX, X form the device IV, V, VI, VII, VIII, IX, X, respectively.

DC connection terminal K3 is connected to DC connection terminal K4 by a series circuit of coil L2, switching element S5 and resistor IIIa. A common junction point of coil L2 and switching element S5 is connected to an anode of diode D5. A cathode of diode D5 is connected to a common junction point of switching element S5 and resistor IIIa and to connection terminal K2 via capacitor C1. The cathode of diode D5 is also connected to connection terminal K1. Connection terminal K1 is connected to connection terminal K2 by a series circuit of switching elements S1 and S2. A cathode of diode D1 is connected to terminal K1. An anode of the diode D1 and a cathode of diode D2 are connected to a common junction point of switching elements S1 and S2. An anode of diode D2 is connected to connection terminal K2. Switching element S2 is shunted by a series circuit of coil L1, lamp connection terminal K5, lamp LM, lamp connection terminal K6, and switching element S4. Connection terminal K1 is connected to lamp connection terminal K6 by switching element 3. An anode of diode D3 is connected to lamp connection terminal K6. A cathode of diode D3 is connected to connection terminal K1. An anode of diode D4 is connected to connection terminal K2. A cathode of diode D4 is connected to lamp connection terminal K6. Gate electrodes of switching elements S1, S2, S3 and S4 are connected to outputs of drive circuit I. The gate electrodes of switching elements S1 and S2 are also connected to outputs of drive circuit II. An output of drive circuit I is connected to an input of drive circuit II. Inputs of integrator IIIb are connected to ends of resistor IIIa. An output of integrator IIIb is connected to an input of circuit portion VI. A further input of circuit portion VI is connected to an output of circuit portion IV. An output of circuit portion VI is connected to an input of circuit portion VII. An output of circuit portion VII is connected to a gate electrode of switching element S5. The output of integrator IIIb is also connected to an input of circuit portion V. A further input of circuit portion V is connected to an output of circuit portion IV. An output or circuit portion V is connected to an input of drive circuit II. An input of circuit portion VIII is connected to connection terminal K1 and a further input of circuit portion VIII is connected to connection terminal K2. An output of circuit portion VIII is connected to an input of circuit portion X. An output of circuit portion IX is connected to a further input of circuit portion X. An output of circuit portion X is connected to an input of circuit portion VII.

The operation of the circuit arrangement shown in FIG. 1 is as follows.

When a DC voltage source is connected to DC connection terminals K3 and K4, the circuit portion VII generates a high-frequency drive signal. This renders the switching element S5 alternately conducting and non-conducting, so that the DC voltage supplied by the DC voltage source is converted into a higher DC voltage which is present between connection terminals K1 and K2 and which serves as a supply voltage for the DC-AC converter. During the run-up of the lamp, circuit portion IX generates a signal Si4 which represents a desired value of the voltage between connection terminals K1 and K2, while circuit portion VIII generates a signal Si3 which represents the value of the voltage between connection terminals K1 and K2. The duty cycle of the switching element S5 is adjusted by signal Si3 and signal Si4 via circuit portions VII and X in such a way that the voltage between connection terminals K1 and K2 is substantially equal to the desired value. The DC-DC converter thus acts as a voltage source, so that the supply voltage of the DC-AC converter is substantially constant. The DC-AC converter operates as follows during the lamp run-up. Almost immediately after ignition of the lamp LM, which is realized with means not shown in FIG. 1, the first drive circuit I and the second drive circuit II generate the first and second drive signals, respectively. The frequency of the second drive signal is considerably higher than the frequency of the first drive signal. The circuit arrangement is brought into two different operational states by these drive signals, alternating with the frequency of the first drive signal. In the first operational state, both switching element S2 and switching element S3 are non-conducting. Switching element S4 is in the conducting state brought on by the first drive signal, while switching element S1 is rendered alternately conducting and non-conducting by the second drive signal. While the switching element S1 is conducting, a direct current flows through the series circuit formed by connection terminal K1, switching element S1, coil L1, lamp connection terminal KS, lamp LM, lamp connection terminal K6, switching element S4, and connection terminal K2. While the switching element S1 is non-conducting, this direct current flows through the circuit formed by coil L1, lamp connection terminal K5, lamp LM, lamp connection terminal K6, switching element S4, and diode D2. Switching element S1, coil L1, and diode D2 function as a forward converter in this first operational state. While switching element S1 is conducting, the amplitude of the direct current increases substantially linearly, whereas in the non-conducting state of switching element S1 the amplitude of the direct current decreases linearly. In the second operational state, switching elements S1 and S4 are non-conducting. Switching element S3 is in the conducting state brought on by the first drive signal, while switching element S2 is rendered alternately conducting and non-conducting by the second drive signal. While switching element S2 is conducting, a direct current flows through the series circuit formed by connection terminal K1, switching element S3, lamp connection terminal K6, lamp LM, lamp connection terminal K5, coil L1, switching element S2, and connection terminal K2. This direct current flows through the lamp LM in a direction opposite to that of the direct current which flows through the lamp LM in the first operational state. While switching element S2 is non-conducting, the direct current flows in the circuit formed by lamp connection terminal K6, lamp LM, lamp connection terminal K5, coil L1, diode D1, and switching element S3. In the second operational state, switching element S2, diode D1 and coil L1 function as a forward converter. While the switching element S2 is conducting, the amplitude of the direct current increases substantially linearly, whereas in the non-conducting state of switching element S2 the amplitude of the direct current decreases substantially linearly. Since the circuit arrangement is brought into the first and into the second operational states alternately with the frequency of the first drive signal during the lamp run-up and the frequency of the second drive signal is considerably higher than that of the first drive signal, the current through the lamp has the shape of a low-frequency commutated direct current of substantially constant amplitude with a comparatively high-frequency, substantially triangular alternating current superimposed thereon.

The average value of the voltage across the resistor IIIa is a measure for the current through the lamp LM during the run-up of the lamp LM. A signal Si1 which represents the average value of the voltage across resistor IIIa is present at the output of the integrator IIIb. Circuit portion IV generates a signal Si2 which represents a desired value of the current through the lamp LM. Circuit portion V adjust the duty cycle of the second drive signal in dependence on these two signals Si1 and Si2. The current through the lamp LM is continually controlled at substantially the desired value during the run-up in this manner.

After the run-up of the lamp, when the voltage across the lamp has become constant, the circuit arrangement switches over to stationary operation. The second drive circuit is de-activated, so that the second drive signal is no longer generated and the first drive signal renders switching elements S1 and S4 on the one hand and switching elements S2 and S3 on the other hand conducting and non-conducting in turn in such a way that the DC-AC converter is operated as a comparatively low-frequency commutator. During this stationary operation, circuit portion VI controls the duty cycle of the high-frequency drive signal generated by circuit portion VII in dependence on the two signals Si1 and Si2. The current through the lamp LM during stationary operation is continually controlled to substantially the desired value in this way, and the DC-DC converter is used as a current source during stationary lamp operation.

It will thus be seen that the objects set forth above, among those made apparent from the preceding description, are efficiently obtained, and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic features of the invention herein described and all statements of the scope of the invention which, as a matter of language, might be said to fall therebetween.

I claim:

1. A circuit arrangement for operating a discharge lamp, comprising a DC-AC converter including a first branch comprising a series circuit of two switching elements, a respective unidirectional element shunting each switching element and connection terminals for connection to poles of a DC voltage source;

- a load branch comprising inductive means and lamp connection terminals for accommodating a lamp, which load branch shunts one of the switching elements of the first branch; and

- a first drive circuit for generating a first drive signal during stable lamp operation for rendering each of the switching elements in the first branch alternately conducting and non-conducting such that each switching element is rendered conducting and non-conducting once in succession within a time interval during which the other switching element is non-conducting;

characterized in that: the DC-AC converter further comprises a second drive circuit coupled to the first drive circuit for generating a second drive signal for rendering each of the switching elements alternately conducting and non-conducting such that each switching element is rendered consecutively conducting and non-conducting more than once within a time interval during which the other switching element is kept in the non-conducting state by the first drive signal.

2. A circuit arrangement as claimed in claim 1, further including a DC-DC converter coupled to the connection terminals.

3. A circuit arrangement as claimed in claim 2, further including first signal generating means for generating a first signal which represents lamp current, second signal generating means for generating a second signal which represents a desired value of the lamp current, and second drive signal adjustment means for adjusting a duty cycle of the second drive signal in dependence on the first signal and the second signal.

4. A circuit arrangement as claimed in claim 3, characterized in that the second signal is time-dependent.

5. A circuit arrangement as claimed in claim 4, characterized in that the DC-DC converter comprises a further switching element, and the circuit further comprises first adjustment means for adjusting a duty cycle of the further switching element of the DC-DC converter in dependence on the first signal and the second signal, third signal generating means for generating a third signal which represents a potential difference between the connection terminals, fourth signal generating means for generating a fourth signal which represents a desired value of the potential difference between the connection terminals, and second adjustment means for adjusting the duty cycle of the drive signal generated by the further switching element of the DC-DC converter in dependence on the third signal and the fourth signal.

6. A circuit arrangement as claimed in claim 3, characterized in that the DC-DC converter comprises a further switching element and in that the circuit arrangement further comprises a first adjustment means for adjusting a duty cycle of the further switching element of the DC-DC converter in dependence on the first signal and the second signal, third signal generating means for generating a third signal which represents a potential difference between the connection terminals, fourth signal generating means for generating a fourth signal which represents a desired value of the potential difference between the connection terminals, and second adjustment means for adjusting the duty cycle of the drive signal generated by the further switching element of the DC-DC converter in dependence on the third signal and the fourth signal.

7. A circuit arrangement as claimed in claim 1, further including first signal generating means for generating a first signal which represents lamp current, second signal generating means for generating a second signal which represents a desired value of the lamp current, and second drive signal adjustment means for adjusting a duty cycle of the second drive signal in dependence on the first signal and the second signal.

8. A circuit arrangement as claimed in 7, characterized in that the second signal is time-dependent.

9. A circuit arrangement for operating a discharge lamp, comprising:

- a full bridge circuit including a first pair of transistors coupled to receive a DC voltage and a second pair of transistors, each transistor having a main current path, said transistors of said first pair being coupled together by their main current paths, and said transistors of said second pair being coupled together by their main current paths;

- a load branch including lamp connection terminals coupling said main current paths of said first transistor pair to said main current paths of said second transistor pair;

- first drive means coupled to said first pair of transistors for rendering each transistor of said first pair of transistors alternately conducting and non-conducting once in succession within a time interval during which the other transistor of said first transistor pair is non-conducting, said first drive means being coupled to said second pair of transistors for rendering each transistor of said second pair alternately conducting and non conducting once in succession within a time interval during which the other transistor of said second transistor pair is non-conducting; and

- second drive means coupled to said first pair of transistors for rendering each of the transistors of said first pair of transistors consecutively conducting and non-conducting more than once within a time interval during which the other transistor of said first transistor pair is kept in the non-conducting state by said first drive means.

10. A circuit arrangement for operating a discharge lamp, including a DC-AC converter comprising:

- a first pair of transistors coupled to receive a DC voltage, each transistor being switchable into a conducting state and a non-conducting state;

- a load branch shunting one of said transistors and including lamp connection terminals;

- first drive means coupled to said first transistor pair for switching each transistor of said first transistor pair alternately into its conducting state at a first switching frequency such that both transistors of said first transistor pair are not in their conducting states concurrently; and

- second drive means for switching one of said transistors of said first transistor pair at a frequency higher than the first switching frequency while the other of said transistors of said first transistor pair is in its non-conducting state.

11. A circuit arrangement according to claim 10, wherein said load branch further includes an inductive device, and said switching of said first pair of transistors generates a current across said lamp connection terminals having a shape of a low-frequency commutated direct current with a comparatively high frequency, substantially triangular alternating current superimposed thereon.

12. A circuit arrangement according to claim 11, further including comparison means for comparing said current across said lamp connection terminals to a predetermined value and generating a current comparison signal representative of said current; and adjusting means for adjusting the duty cycle of said switching by said second drive means in dependence upon the current comparison signal.

13. A circuit arrangement according to claim 12, further including an up-converter, coupled to said first transistor pair, for receiving a DC voltage for providing a stepped-up DC voltage to said first transistor pair, said up-converter including a switching element and means for switching said switching element;

voltage comparison means for generating a voltage comparison signal upon comparing the stepped-up DC voltage across said first transistor pair to a predetermined desired voltage value; and means for adjusting the duty cycle of said switching of said switching element in dependence on the voltage comparison signal.

14. A circuit arrangement according to claim 13, wherein said switching of said switching element is also dependent upon the current comparison signal.

15. A circuit arrangement according to claim 10, further including an up-converter, coupled to said first transistor pair, for receiving a DC voltage for providing a stepped-up DC voltage to said first transistor pair, said up-converter including a switching element and means for switching said switching element;

voltage comparison means for generating a voltage comparison signal upon comparing the stepped up DC voltage across said first transistor pair to a predetermined desired voltage value; and means for adjusting the duty cycle of said switching of said switching element in dependence on the voltage comparison signal.

16. A circuit arrangement according to claim 10, further including a second pair of transistors, each having a main current path, the main current paths of the second pair of transistors being coupled together, and wherein said load branch is coupled to said main current paths of said first transistor pair and said second transistor pair, and said first drive means switches said second pair of transistors alternately into their conducting states at the first switching frequency, such that both transistors of said second pair are not in their conducting states concurrently.

* * * * *